Dec. 30, 1941.    R. D. NICHOLS    2,268,461
APPARATUS FOR PRODUCING FLOCCULATION
Filed Nov. 6, 1940
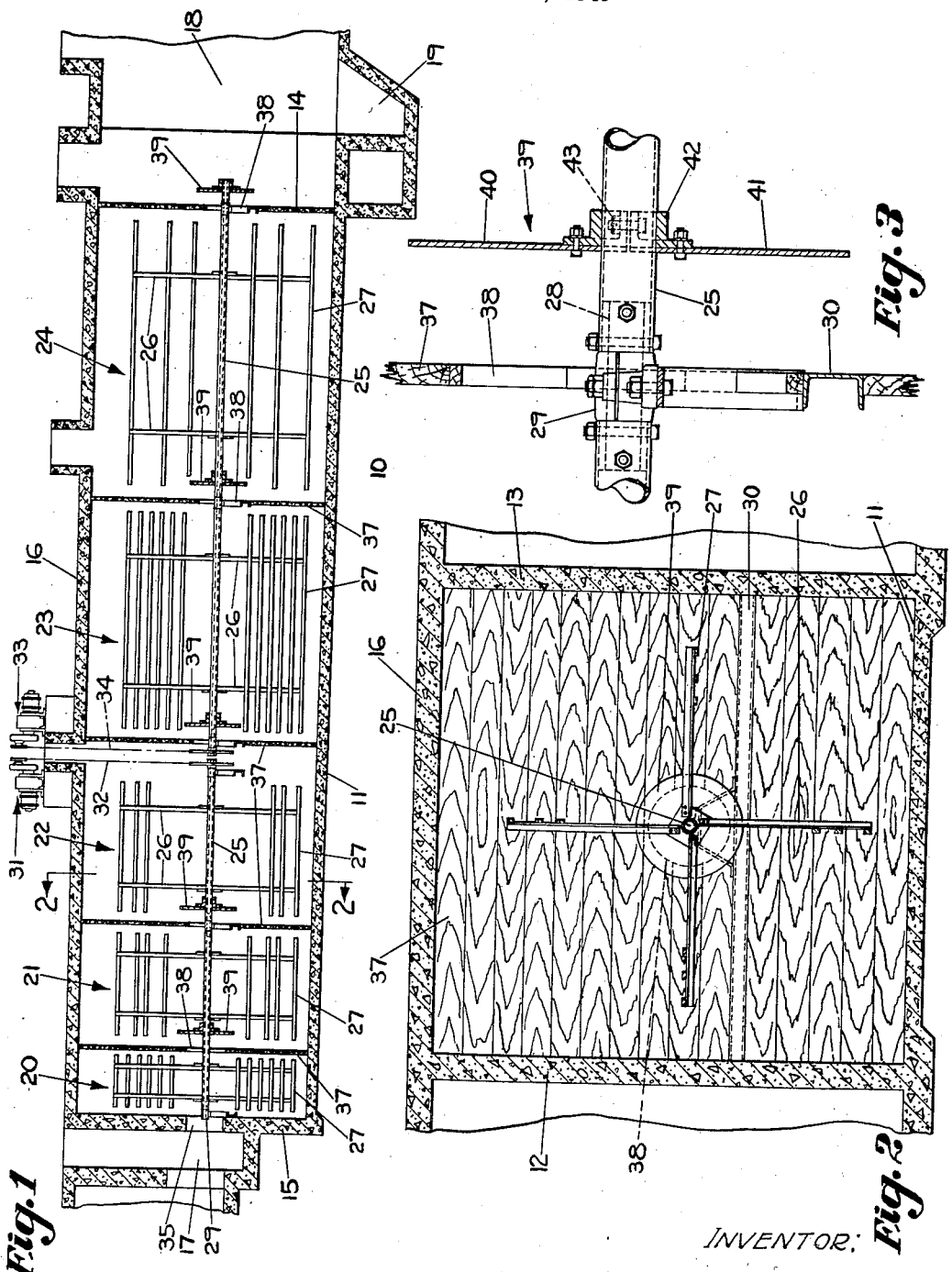
INVENTOR:
RICHARD D. NICHOLS,
By Chas. M. Nissen,
ATTY.

Patented Dec. 30, 1941

2,268,461

UNITED STATES PATENT OFFICE 2,268,461

APPARATUS FOR PRODUCING FLOCCULATION

Richard D. Nichols, Columbus, Ohio, assignor to The Jeffrey Manufacturing Company, a corporation of Ohio Application November 6, 1940, Serial No. 364,490

8 Claims. (Cl. 259—9)

This invention relates to, and one of its objects is to provide, means to control the continuous flow of water through a mechanically equipped flocculation basin in such manner that all the water under treatment will be retained for the optimum time limit with a minimum overall length of travel of water therethrough.

It is another object of this invention to provide means for eliminating detrimental short-circuiting of liquid in a flocculation basin under variation in rate of flow.

Another object of the invention is to provide adjustable means for dissipating port velocities of fluid flowing through a sectional flocculator.

Another object of the invention is to arrange a flocculator and its associated paddle wheel mechanism so that treatment will be in steps of which agitation is progressively reduced and the time period in each step will be progressively increased.

Other objects of the invention will appear hereinafter, the novel features and combinations being set forth in the appended claims.

In the accompanying drawing,

Fig. 1 is an elevation in section of the flocculation tank and the rotary agitators;

Fig. 2 is a cross-section taken along the line 2—2 of Fig. 1; and

Fig. 3 is an enlarged view of the shaft and baffle placed beyond the port in the dividing partitions.

Referring to the drawing the numeral 10 designates a flocculation tank or basin having a floor 11, side walls 12 and 13 and end walls 14 and 15. A cover 16 is preferably provided but this is not essential. The liquid to be treated flows into the basin 10 through the influent channel 17 and from the flocculation basin 10 into a sedimentation basin 18 which may be provided with mechanism, not shown, for collection of the solids that settle to the bottom delivering them to the sump 19 for final removal; for example, as shown in my application, Serial No. 195,608 for Method of and apparatus for separating solids from liquids, filed March 12, 1938, of which this application is a continuation in part, or as shown in the application of Samuel L. Tolman, for Method of and apparatus for clarifying liquids, Serial No. 195,340, filed March 11, 1938.

In order to produce a flocculation of the solid particles contained in the turbid water, sewage or industrial waste, I provide agitator mechanisms 20, 21, 22, 23 and 24, respectively. The structures of the agitator mechanisms 20, 21, 22, 23 and 24 are substantially the same except for differences hereinafter pointed out, and therefore description of said mechanism 24 as illustrated in Figs. 1 and 2 of the drawing will suffice for all of them. Said mechanism comprises a horizontal shaft 25 made up of a section of pipe to which is connected a plurality of radially extending arms 26 carrying paddle boards 27. It will be noted by reference to Fig. 1 that the horizontal shafts 25 of all the agitators are in alignment and are coupled together by shaft extensions 28 which are preferably supported in journals 29 carried by transversely extending beams 30 one of which is seen in Fig. 3 of the drawing. The shaft is shown, in Fig. 1, split at the end of the third compartment. Said agitators 20, 21 and 22 are driven from an electric motorized gear reducer 31 through a chain and sprocket drive mechanism 32. Agitators 23 and 24 are driven from a like drive unit 33 through a chain and sprocket drive mechanism 34. The agitators 20, 21 and 22 may be rotated at a higher number of revolutions per minute than agitators 23 and 24 and with the arrangement of paddle boards 27 there is obtained a vigorous agitation in the compartment 20 with a progressive decreasing of agitation in subsequent compartments.

The agitators 21 and 22 are rotated at the same speed but the agitation effected by the agitator 22 is less than that effected by the agitator 21. The agitators 23, 24 are rotated at a lower rate of speed but the agitation effected by the agitator 24 is less than that effected by the agitator 23. In this manner the progressive decrease of agitation in the successive compartments is obtained. In this connection it should also be observed by reference to Fig. 1 that each successive compartment is longer than the next preceding so that while the paddles 27 are successively longer in the successive compartments, the progressive decrease of agitation in successive compartments is nevertheless maintained.

It is desirable that all suspended solids be flocculated prior to flow of the liquid into the sedimentation basin. This requires an optimum time therefore under any or all conditions of flow, all of the liquid under treatment must be retained in the zone of action of the agitator mechanism at least the minimum time. If short-circuiting of liquid is not eliminated some of the liquid will pass the effluent in a shorter time period especially if the designed holding capacity of the flocculation basin provides a retention time fairly consistent with the optimum time.

Dividing the tank 10 into several compartments of progressively increased holding capacity or length, one for each of the agitator mechanisms 20, 21, 22, 23 and 24, by placement of the division walls 37 which are solid except for the ports 38 may be suitable if the ports 38 are predesigned for a given flow. It has been found that port velocities up to and including one foot per second can be utilized without danger of breaking previously formed floc. Port velocities of this magnitude will, however, create a channeling of flow in the succeeding compartment, therefore I have provided baffles 39 which are attached to the shaft 25 beyond the ports to dissipate the velocity of the fluid and direct it into the path of the paddle boards 27. It has also been found that port velocities as low as .4 of a foot per second is ample to provide control over short-circuiting, therefore with the baffles 39 attached to the shaft 25 and spaced from the partition such that said velocities will be dissipated quickly a variation in flow of over one hundred percent can be handled without resulting in undesirable and excessive short-circuiting of liquid while under treatment. The baffle 39 comprise two sections of steel plate 40 and 41 of an outside diameter approximately 1½ to 2 times the diameter of the port, bolted to two sections of clamping member 42 which may be fixed to the shaft 25 by the clamping bolts 43. Movement of the baffle 39 toward or from the partition will require only the loosening of the clamping bolts 43. The baffle 39 need not be moved under conditions of variation in flow as above described unless it is desirable to increase the flow beyond the rate which would result in greater port velocities than one foot per second.

That is to say, while the ports 38 may be predetermined for flows up to a given maximum of volume, when the latter is exceeded there is a tendency to a channeling of flow in succeeding compartments. By associating the baffles with the ports 38, however, there may be an increase of volume over said given maximum without undesirable or excessive short-circuiting of the liquid while under treatment in the tank 11.

It should be understood that each central port 38 effects a drop in head between each compartment and the next succeeding one. Up to a port velocity of one cubic foot per second per square foot of port area the baffles 39 are each set at certain spacings from the ports 38. When the volume increases to effect a greater velocity than that, the baffles should be readjusted by increasing their spacings from the ports. It should also be noted that the predesigning of the port areas and the predesigning of the baffle areas in relation to the port areas in combination with the adjustments of such spacings are for the purpose of maintaining efficiency of operation for installations in which the volume of liquid treated increases beyond what the ports alone could be predesigned to provide for. To obtain the desired efficiency of operation the retention of any given portion of the sewage in the tank 11 should be reduced to a minimum consistent with thorough treatment of the water or sewage for the formation of flocs to remove impurities. That is, all solids should be flocculated before the liquid reaches the sedimentation basin 18. The detention period must be of sufficient length of time to effect this result. By predesigning the port areas and the baffle areas and adjusting the spacings between the baffles and the ports, the retention period may be reduced to a minimum because short-circuiting is practically eliminated and thorough mixing is assured for treatment of sewage the volume of flow of which may vary considerably. This operation is carried out to obtain thorough mixing of the chemical coagulant with the sewage being treated but it should be understood that the successive reduction in head between each compartment and the next by reason of the ports 38 and the spreading actions of the spaced baffles 39 are in co-operation with the progressive decrease of agitation in subsequent compartments and the progressive prolongation of flow through successive compartments in accordance with the progressive increase in lengths thereof, thereby obtaining maximum efficiency in the production of flocs within the retention periods desired.

In operation the liquid to be treated, together with chemical coagulant, if any, flows through the channel 17 and opening 35 into the first compartment where it is thoroughly mixed by action of the rotary agitator 20. All liquid must then flow to the center against the action of the paddle wheel to pass through the port 38. The velocity of travel of the liquid through any of the compartments, disregarding the rotary movement produced by the paddle wheel, and assuming actual displacement, would be the length of the tank in feet divided by the theoretical retention period. To convert this velocity of flow into the velocity through the relatively small port 38 takes power which in this case is represented by the differential head in successive compartments. This power, actually velocity, must be dissipated quickly and in this invention the baffles 39 being in the path of the flow through the port 38 distributes the flow around its periphery and slows the velocity to a consistency with the velocity of flow through the basin. At the end of each compartment 20, 21, 22, 23 and 24 this same condition must exist if short-circuiting is to be eliminated.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a liquid treating apparatus, a flocculator comprising a container having influent and effluent ends, division walls intermediate such ends and forming said container into a plurality of compartments through which liquid to be treated flows successively, a shaft disposed on the approximate longitudinal centerline of said container and extending substantially from one end to the other, a pair of radial arms fixed to said shaft in each of said compartments, a plurality of paddle boards fixed to each pair of radial arms and disposed along lines substantially parallel to the axis of said shaft, openings in each of said division walls confining the flow of liquid from one compartment to another substantially along the axis of the shaft, and baffles one associated with each of said openings and in alinement therewith and each having an area in its own plane larger than the area of its associated opening, each baffle being disposed down stream beyond its associated opening so as to be spaced therefrom.

2. In a liquid treating apparatus, a flocculator comprising a container, division walls forming said container into a plurality of compartments through which liquid to be treated flows successively, a shaft disposed on the approximate longitudinal centerline of said container and extending substantially from one end to the other, a pair of radial arms fixed to said shaft in each of said compartments, a plurality of paddle boards fixed to each pair of radial arms and disposed along lines substantially parallel to the axis of said shaft, openings in each of said division walls confining the flow of liquid from one compartment to another substantially along the axis of the shaft, and baffles one associated with each of said openings and in alinement therewith and each having an area in its own plane larger than the area of its associated opening, each baffle being disposed on said shaft down stream beyond its associated opening so as to be spaced therefrom.

3. In a liquid treating apparatus, a flocculator comprising a container, division walls forming said container into a plurality of compartments through which liquid to be treated flows successively, a shaft disposed on the approximate longitudinal centerline of said container and extending substantially from one end to the other, a pair of radial arms fixed to said shaft in each of said compartments, a plurality of paddle boards fixed to each pair of radial arms and disposed along lines substantially parallel to the axis of said shaft, openings in each of said division walls confining the flow of liquid from one compartment to another substantially along the axis of the shaft, and baffles one associated with each of said openings and in alinement therewith and each having an area in its own plane larger than the area of its associated opening, each baffle being adjustably mounted on said shaft spaced downstream from its associated opening.

4. In liquid treating apparatus, the combination with a flocculator comprising a container, of spaced-apart partitions dividing said container into a plurality of compartments, each partition having an opening at the approximate center thereof to serve as a communicating port for the liquid flow from one compartment to the next succeeding one, a plurality of agitators one for each compartment, each agitator being adapted to effect less agitation of the liquid than the next preceeding one, means for rotating said agitators each on the axis of the center of the adjacent opening in the next preceding partition, and baffle plates each connected to an agitator to rotate therewith while spaced down stream from the adjacent opening, each baffle plate being larger in area than the adjacent opening and each succeeding compartment being of greater liquid holding capacity than the next preceding one.

5. In a liquid treating apparatus, the combination with a flocculator comprising a container, of spaced-apart partitions dividing said container into a plurality of compartments of progressively increasing holding capacity, each partition having an opening at the approximate center thereof to serve as a communicating port for the liquid flow from one compartment to the next succeeding one, a plurality of agitators one for each compartment, each agitator being adapted to effect less agitation of the liquid than the next preceding one, and means for rotating said agitators each on the axis of the center of the adjacent opening in the next preceding partition.

6. In a liquid treating appartus, a flocculator comprising a container having influent and effluent ends, division walls intermediate such ends spaced to form said container into a plurality of compartments of progressively increased length through which liquid to be treated flows successively, a shaft disposed on the approximate longitudinal center line of said container and extending substantially from one end to the other, a pair of radial arms fixed to said shaft in each of said compartments, a plurality of paddle boards fixed to each pair of radial arms and disposed along lines substantially parallel to the axis of said shaft, and openings in each of said division walls confining the flow of liquid from one compartment to another substantially along the axis of the shaft.

7. In a liquid treating apparatus, a flocculator comprising a container having influent and effluent ends, division walls intermediate such ends spaced to form said container into a plurality of compartments of progressively increased holding capacity, openings in each division wall to serve as a communicating port for the liquid flow from one compartment to the next succeeding one, an agitator in each of said compartments, each agitator being adapted to effect less agitation of the liquid than the next preceding one, and means for rotating all of said agitators.

8. In a liquid treating apparatus, a flocculator comprising a container having influent and effluent ends, division walls intermediate such ends spaced to form said container into a plurality of compartments of progressively increased length, openings in each division wall to serve as a communicating port for the liquid flow from one compartment to the next succeeding one, an agitator in each of said compartments, each agitator being adapted to effect less agitation of the liquid than the next preceding one, and means for rotating all of said agitators.

RICHARD D. NICHOLS.

CERTIFICATE OF CORRECTION.

Patent No. 2,268,461. December 30, 1941.
RICHARD D. NICHOLS.

It is hereby certified that error appears in the printed specification of the above numbered patent requiring correction as follows: Page 2, second column, line 40-41, after the word and period "eliminated." insert the following paragraph -

> It should be understood that mention above to port velocities in feet per second has reference to flow in cubic feet per square foot through the ports into the various compartments and that the flow through the compartments is much less. For instance, if the tank is sixty feet long and the detention period predetermined as thirty minutes the rate of flow through the tanks is two lineal feet per minute or one thirtieth of a lineal foot per second whereas the port velocity may be one cubic foot per second per square foot for good hydraulic conditions, provided the baffles are associated with the ports. For instance, if the volume of flow through the tank 10 is one million gallons per day the port velocity may be one cubic foot per second per square foot of area and when the volume is increased to one and one-half million gallons per day, the port velocity may be increased to one and one-half cubic feet per second per square foot without resulting in undesirable and excessive short circuiting of liquid while under treatment provided the baffles are associated with the ports and adjusted to a larger spacing therefrom so that the increased port velocity will not unduly increase the velocity from the baffles to the zone of cylindrical paths of travel of the agitators.;

and that the said Letters Patent should be read with this correction therein that the same may conform to the record of the case in the Patent Office.

Signed and sealed this 9th day of June. A. D. 1942.

(Seal)

Henry Van Arsdale,
Acting Commissioner of Patents.